T. H. MANCHESTER & E. H. GOLD.
HOSE COUPLING.
APPLICATION FILED JAN. 24, 1911.
1,019,980.
Patented Mar. 12, 1912.
3 SHEETS—SHEET 2.
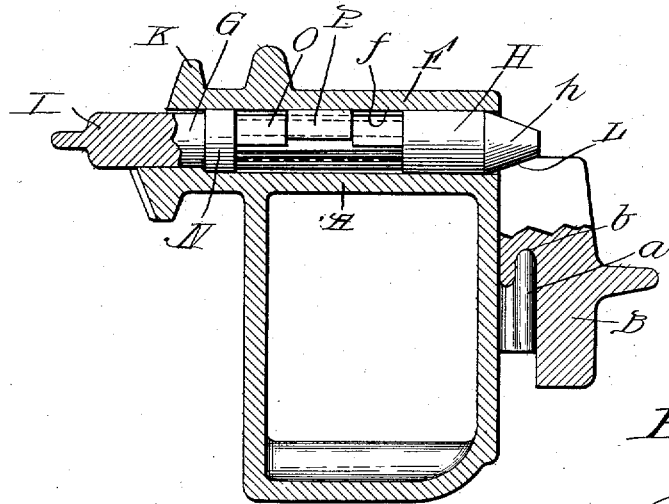
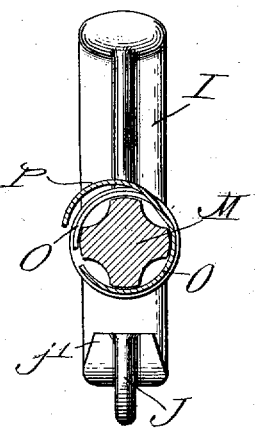
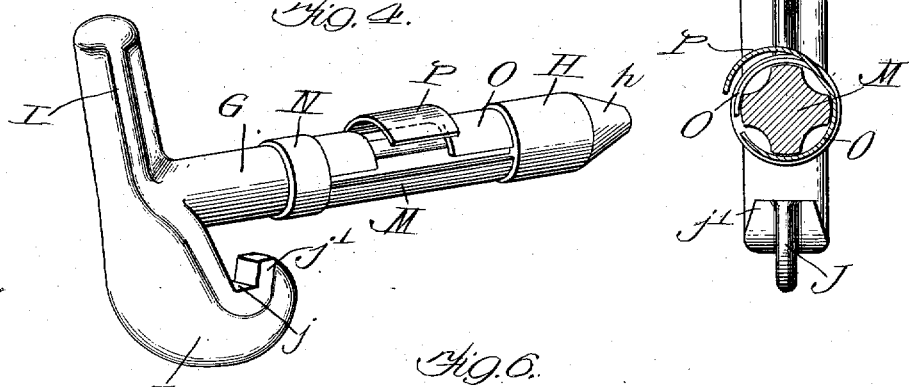
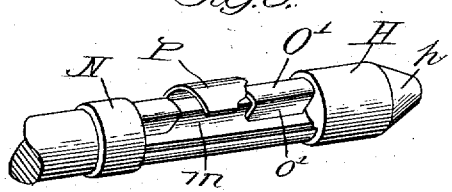

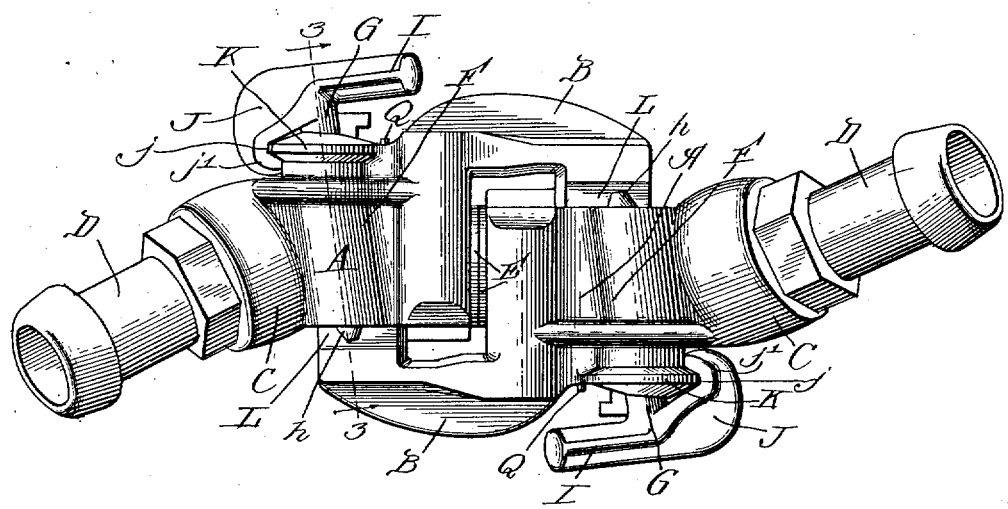
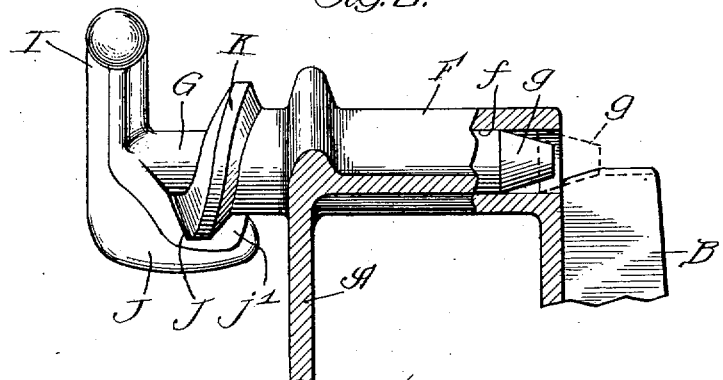
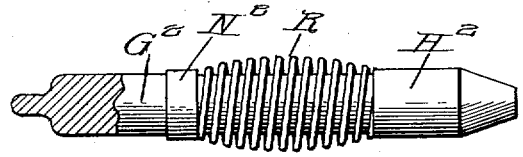

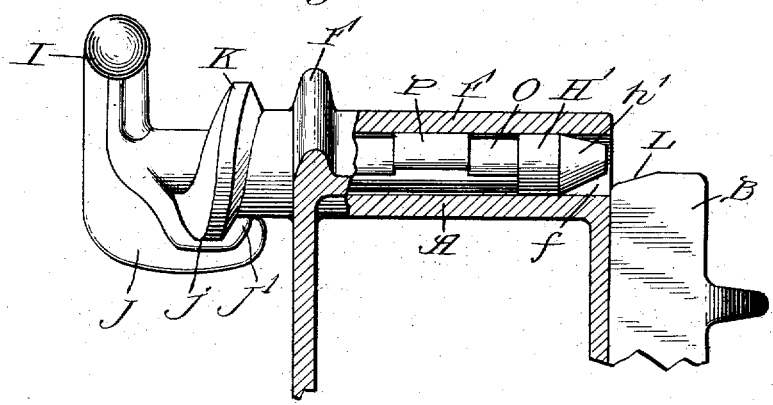
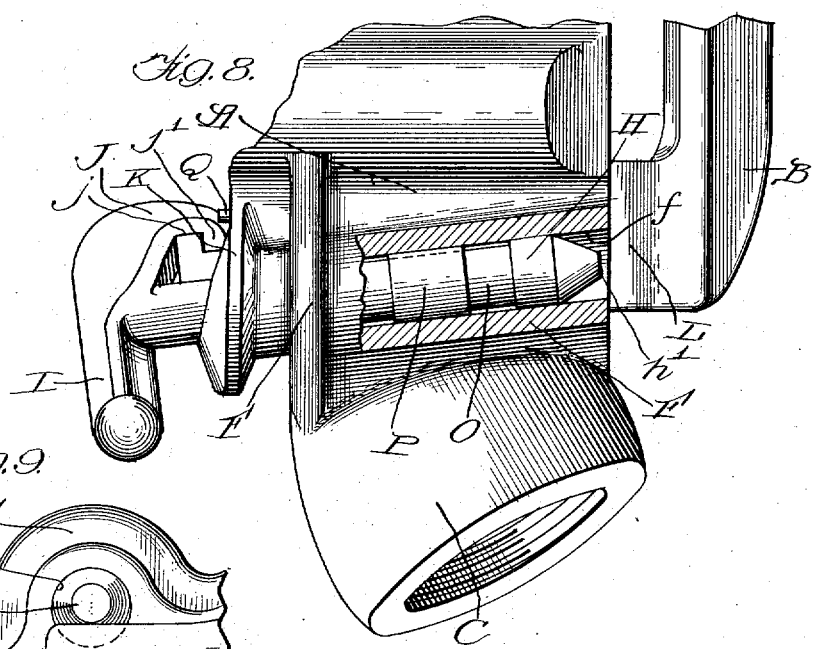
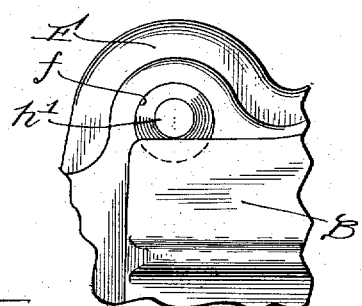

UNITED STATES PATENT OFFICE.

THOMAS H. MANCHESTER AND EGBERT H. GOLD, OF CHICAGO, ILLINOIS; SAID MANCHESTER ASSIGNOR TO SAID GOLD.

HOSE-COUPLING.

1,019,980.  Specification of Letters Patent.  Patented Mar. 12, 1912.

Application filed January 24, 1911. Serial No. 604,347.

*To all whom it may concern:*

Be it known that we, THOMAS H. MANCHESTER and EGBERT H. GOLD, citizens of the United States, residing at Chicago, in the county of Cook and State of Illinois, have invented certain new and useful Improvements in Hose-Couplings, of which the following is a specification.

Our invention relates to hose couplings and particularly to means for locking the mating coupler heads of the type of couplings known as Sewall or gravity couplings against accidental disengagement or uncoupling; and the invention has for its object to provide certain novel and improved constructions, arrangements and devices for accomplishing this result.

One of the specific primary objects which we have had in view has been to improve upon the coupler lock shown and described in a certain application filed by the said Thomas H. Manchester September 8, 1910, and bearing Serial No. 581,039, by providing a more effectual engagement between the locking pin and the arm of the mating coupling member with which it engages.

A further object of the invention is to provide improved means for keeping the pin or bolt, when in its unlocking or inoperative position, from being jarred or otherwise accidentally moved into the locking position; it being desirable in some cases to leave the coupler heads unlocked so that they may be readily uncoupled or may readily uncouple automatically under circumstances requiring automatic uncoupling.

The invention is illustrated, in certain slightly different embodiments, in the accompanying drawings, wherein—

Figure 1 is a plan view of a pair of engaged coupler heads provided with the locks of our invention, Fig. 2, a fragmentary transverse sectional view of one of said heads illustrating the construction of the lock, Fig. 3, a similar sectional view taken on line 3—3 of Fig. 1, Fig. 4, a view, in perspective, of a preferred construction of the locking pin, Fig. 5, a transverse sectional elevation of the pin looking toward the handle, Fig. 6, a fragmentary view, in perspective, of a slightly modified form of spring, Fig. 7, a view similar to Fig. 2 illustrating a modified form of locking pin, Fig. 8, a fragmentary sectional plan showing the same modification, Fig. 9, a side view of the parts shown in Figs. 7 and 8, and Fig. 10, a side elevation, with parts in section, of a modified form of locking pin employing a coiled instead of a plate spring.

Like characters of reference indicate like parts in the several figures of the drawings.

Referring first to Figs. 1 to 5 inclusive, A A designate a pair of mating coupler heads of the gravity or Sewall type, each being formed with an arm B formed on its inner surface with an undercut groove $b$ adapted to be engaged by the lug $a$ on the head of the mating coupler. The coupler heads are shown as formed with the necks C, C provided with the usual nipples D, D to receive the hose. It will be understood that the coupler heads shown are coupled together by a downward rocking or swinging movement and uncoupled by a reverse movement. From this it follows that if sufficient strain is put on the coupling longitudinally it will automatically uncouple. This is desirable in order to prevent the rupture of the hose or associated parts if, as sometimes happens, the cars between which the coupling is located are disconnected without the uncoupling of the train pipe sections. However such automatic uncoupling may take place when it is not desirable. For example, when considerable strain is placed upon the coupling in rounding reverse curves. Our invention provides a suitable lock, which may be used or not as desired, for locking the couplers together so that automatic uncoupling cannot take place. Furthermore, the locking mechanism is so constructed as to force into close contact the faces of the coupler heads, for example, the faces presented by the gaskets E E (Fig. 1). While each coupler head is preferably provided with a lock of this character, it will be obvious that if desirable there need be but one such lock to a coupling. It will be sufficient to describe the locking mechanism on one of the heads. Cast on the upper face of the head A is a boss F having a cylindrical bore $f$ which receives a cylindrical locking pin G. On the end of the pin G is driven a cap piece H, the end of which $h$ is preferably in the form of a frustum of a cone. On the other end of the pin is formed, preferably integrally therewith, a handle I having on one side the enlargement or wing J in which is a notch $j$. The notched wing on the pin fits over a spiral thread K arranged on the boss F, preferably cast thereon. The conical end $h$ of the pin is adapted to engage an inclined surface L on the upper side of the arm B of the complementary coupling member. By driving the end of the pin against this inclined surface the arm B is forced down and the coupler heads, that is, the gaskets which they carry, forced closely together so as to prevent any escape of steam. At the same time considerable friction is developed between the conical end of the pin and the surface on which it bears which resists the displacement of the pin from its locking position which might result otherwise from the vibration of the coupling when the train is in motion, or from other causes. In other words, the conical end of the pin has a jamming engagement with the correspondingly inclined flat surface L of the coupler arm. More friction is developed between the notched wing J at the other end of the pin and the spiral thread K. The thread K is preferably cast on the coupler head and the pin may also be made of cast iron. As castings of this sort are necessarily somewhat rough there will always be somewhat of a bind between the wing of the pin and the thread. As will be obvious, this bind is increased when the conical end of the pin meets the coupler arm because this sets the pin back so as to bring the projection $j'$ of the wing against the inner surface of the thread K. We do not claim herein broadly the provision of the head with a spiral thread and the pin with a member engaging and taking a frictional hold on said thread, nor the tapered or conical configuration of the end of the pin; these features being invented by Thomas H. Manchester solely and claimed in the Manchester application referred to above. The pin is preferably provided with a spring adapted particularly to keep the pin from being accidentally turned or jarred out of its retracted position. It might otherwise happen that the vibration of the train or other causes might move the pin far enough so that it will interfere with the opening of the coupling. This spring likewise helps to a certain extent to keep the pin in its locked position. The center portion M of the pin is of smaller diameter than the cap piece H and than the bearing N at the handle end, and a spring steel collar O surrounds this portion of the pin and is formed with the bent up curved lip P which bears against the surface of bore $f$. The friction between this spring member P and the casting is sufficient to keep the pin from being jarred or otherwise turned out of its retracted position by the exertion of a slight force upon it. The wing J abuts against a pin or lug Q when the locking pin is turned to its retracted position.

In Figs. 3, 4 and 5 the collar O turns on the pin. Thus it is only the longitudinal movement of the pin that is resisted by the spring finger P. It may be desirable to have the rotation of the pin also resisted and in such case the edge $o'$ of the collar O', as shown in Fig. 6, is bent down into a groove or recess $m$ in the pin.

In Figs. 7, 8 and 9, the arrangements are substantially the same as shown in the preceding figures except that the tapered end $h'$ of the cap piece H' is eccentric. This results in increasing the driving force of the pin against the coupler arm which increases the bind between the parts and also the force with which the coupler heads are pressed together.

In Fig. 10 we have shown a spiral spring employed instead of the plate spring of the preceding figures. $G^2$ designates the pin as a whole. The spiral spring R is seated between shoulders formed by the bearing $N^2$ and the cap piece $H^2$. When the pin is fitted to the coupler head above described the spring R is compressed and acts as a brake to prevent the accidental movement of the pin.

While we have shown certain preferred embodiments of the invention, it will be realized that there might be some changes in form, construction, arrangement and proportion of the parts without departure from our invention; therefore we do not limit ourselves to these particulars except so far as the same are made specifically limitations on certain of the claims herein.

We claim:

1. The combination with a gravity coupling comprising mating coupler heads each formed with an arm adapted to engage with the other coupler head and at least one of the same with a bore, of a locking pin rotatably mounted in said bore and adapted to bear against the arm engaging said coupler head, said coupler head being provided exteriorly with a spiral thread and said pin being provided with a handle and formed so as to engage with and take a frictional grip upon said spiral thread, and a spring interposed between said pin and the surface constituted by the bore and adapted to resist without preventing the movement of said locking pin.

2. The combination with a gravity coupling comprising mating coupler heads each formed with an arm adapted to engage with the other coupler head and at least one of said coupler heads being formed with a transverse bore, of a locking pin rotatably mounted in said bore and adapted to bear against the upper surface of the arm which engages with said head; said coupler head being provided exteriorly with a spiral thread and said pin being provided with a handle and formed so as to engage with and take a frictional grip upon said thread; and a spring on the pin which bears against the inner surface of said bore, for the purpose specified.

3. The combination with a gravity coupling comprising mating coupler heads each formed with an arm adapted to engage with the other coupler head and at least one of said coupler heads being formed with a transverse bore, of a locking pin rotatably mounted in said bore and adapted to bear against the upper surface of the arm which engages with said head; said coupler head being provided exteriorly with a spiral thread and said pin being provided with a handle and formed so as to engage with and take a frictional grip upon said thread; a collar on said pin provided with a spring finger which bears against the inner surface of said bore, for the purpose specified.

4. The combination with a gravity coupling comprising mating coupler heads each formed with an arm adapted to engage with the other coupler head, of a locking pin rotatably mounted in one of said coupler heads and having a conical end which is adapted to bear against the upper surface of the arm engaging with said head; said head having cast on the exterior thereof a spiral thread and said pin being formed with a handle and with a wing notched so that it extends around said thread, and a spring interposed between the pin and the coupler head, for the purpose described.

5. A locking device for couplings comprising a pin rotatably mounted in a bore in one of the members of said coupling and adapted to be shifted longitudinally so as to be brought to bear against the other of said coupling members, and a collar surrounding said pin provided with a spring finger adapted to bear against the side of the bore, for the purpose specified.

6. The combination with a coupling comprising mating coupler heads, of a locking pin rotatably mounted in one of said coupler heads and having a substantially conical end adapted to bear against a surface inclined with respect to the axis of the pin upon the other of said coupler heads; the coupler head in which said pin is mounted being formed exteriorly with a thread and said pin being formed with a transverse handle and with a notched wing adapted to engage with and take a frictional grip upon said thread; and a collar surrounding said pin provided with a spring finger adapted to bear against said coupler head.

7. The combination with a gravity coupling comprising mating coupler heads provided with coengaging means, one of said heads being formed with a bore, of a locking pin rotatably mounted in said bore and adapted to bear against the other coupler head; the coupler head in which the pin is mounted being provided exteriorly with a spiral thread and said pin being provided with a handle and formed so as to engage with and take a frictional grip on said spiral thread, and a spring interposed between said pin and the inner surface of said bore adapted to resist without preventing the movement of said locking pin.

8. The combination with a gravity coupling comprising mating coupler heads with coengaging means, one of said heads being formed with a bore, of a locking pin rotatably mounted in said bore and adapted to bear against the other coupler head; the coupler head in which the pin is mounted being provided exteriorly with a spiral thread and said pin being provided with a handle and formed so as to engage with and take a frictional grip upon said spiral thread; and a collar on said pin provided with a spring finger which bears against the inner surface of said bore for the purpose described.

9. A locking device for couplings comprising a pin mounted so as to have longitudinal movement in a bore in one of the members of the coupling and adapted to be brought to bear against the other of said coupling members, the center portion of said pin being of smaller diameter than the ends thereof and the bore, and a spring which surrounds the reduced portion of the pin and bears against the interior of the bore, for the purpose specified.

THOMAS H. MANCHESTER.
    EGBERT H. GOLD.

Witnesses:
  L. A. FALKENBERG,
  H. L. PECK.

---

Copies of this patent may be obtained for five cents each, by addressing the "Commissioner of Patents, Washington, D. C."